United States Patent
Wu et al.

(10) Patent No.: US 9,985,795 B2
(45) Date of Patent: May 29, 2018

(54) METHOD AND APPARATUS FOR OPTICAL NETWORK UNIT ONU OVERALL RATE LIMITING

(71) Applicant: HUAWEI TECHNOLOGIES CO., LTD., Shenzhen (CN)

(72) Inventors: WenJing Wu, Shenzhen (CN); Wenming Wang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 36 days.

(21) Appl. No.: 15/185,176

(22) Filed: Jun. 17, 2016

(65) Prior Publication Data

US 2016/0301535 A1    Oct. 13, 2016

Related U.S. Application Data

(63) Continuation of application No. PCT/CN2013/090051, filed on Dec. 20, 2013.

(51) Int. Cl.
   *H04B 10/25* (2013.01)
   *H04L 12/18* (2006.01)
   (Continued)

(52) U.S. Cl.
   CPC ............ *H04L 12/18* (2013.01); *H04B 10/25* (2013.01); *H04B 10/27* (2013.01); *H04L 12/1881* (2013.01); *H04N 21/64322* (2013.01)

(58) Field of Classification Search
   None
   See application file for complete search history.

(56) References Cited

U.S. PATENT DOCUMENTS

2006/0126627 A1*   6/2006   Diouf ................. H04L 12/18
                                                              370/390
2007/0025352 A1    2/2007   Tanaka
                           (Continued)

FOREIGN PATENT DOCUMENTS

CN          101009620 A        8/2007
CN          101453672 A        6/2009
                    (Continued)

OTHER PUBLICATIONS

International Search Report dated Oct. 15, 2014, in corresponding International Application No. PCT/CN2013/090051.
(Continued)

*Primary Examiner* — Duc T Duong
(74) *Attorney, Agent, or Firm* — Staas & Halsey LLP

(57) ABSTRACT

Embodiments of the present disclosure provide a method and a device for ONU overall rate limiting. The method includes: receiving a multicast program sent by a multicast program server; making N+M copies of the multicast program; sending N copies of the multicast program to N passive optical network PON ports that request the multicast program on demand; and sending M copies of the multicast program to M ONU rate limiting units corresponding to M ONUs that request the multicast program on demand, discarding the M copies of the multicast program. In the method, after the rate limiting is performed on the multicast program, the multicast program is discarded, so that real-time rate limiting is performed on each ONU without affecting bandwidth of a PON.

16 Claims, 5 Drawing Sheets

(51) Int. Cl.
*H04B 10/27* (2013.01)
*H04N 21/643* (2011.01)

(56) References Cited

U.S. PATENT DOCUMENTS

| | | | |
|---|---|---|---|
| 2009/0022494 A1* | 1/2009 | Yang | H04J 3/1694 398/63 |
| 2009/0274461 A1* | 11/2009 | Xu | H04L 12/2861 398/66 |
| 2010/0189433 A1* | 7/2010 | Trojer | H04Q 11/0067 398/8 |
| 2011/0176808 A1 | 7/2011 | He et al. | |
| 2011/0262138 A1 | 10/2011 | He | |
| 2013/0202113 A1* | 8/2013 | Bernard | H04Q 11/0067 380/287 |
| 2014/0255027 A1* | 9/2014 | Hood | H04J 14/0221 398/58 |

FOREIGN PATENT DOCUMENTS

| | | |
|---|---|---|
| CN | 101883050 A | 11/2010 |
| CN | 101959087 A | 1/2011 |
| CN | 102883190 A | 1/2013 |
| CN | 103428586 A | 12/2013 |
| WO | 2011/026335 A1 | 3/2011 |
| WO | 2012/000248 A1 | 1/2012 |

OTHER PUBLICATIONS

Heinanen et al., "A Single Rate Three Color Marker", Network Working Group, The Internet Society, Sep. 1999, pp. 1-6.
Heinanen et al., "A Two Rate Three Color Marker", Network Working Group, The Internet Society, Sep. 1999, pp. 1-5.
Chinese Office Action dated Jun. 23, 2016 in corresponding Chinese Patent Application No. 201380002370.2.
International Search Report and Written Opinion dated Oct. 15, 2014 in corresponding International Patent Application No. PCT/CN2013/090051.

* cited by examiner

METHOD AND APPARATUS FOR OPTICAL NETWORK UNIT ONU OVERALL RATE LIMITING

CROSS REFERENCE

This application is a continuation of International Application No. PCT/CN2013/090051, filed on Dec. 20, 2013, which is hereby incorporated by reference in its entirety.

TECHNICAL FIELD

The present disclosure relates to the communications field, and in particular, to a method and an apparatus for optical network unit ONU overall rate limiting.

BACKGROUND

An ONU overall rate limiting technology is performing overall rate limiting on all services of an ONU, where all the services share a rate limiting package. For example, a package with a rate limit of 10 M (megabytes) is provided for a user of an ONU. Assuming that the ONU provides an Internet access service, a voice service, and an IPTV (Internet Protocol Television Video) service. The three services share the 10 M package. Generally, the services preempt the 10 M package according to priorities, where the voice service has a highest priority, the IPTV service has a second highest priority, and the Internet access service has a lowest priority. If no other service is used, any service can use a maximum bandwidth of 10 M. However, such an ONU rate limiting technology is constrained in a way that the IPTV service (which is usually propagated in a manner of a multicast packet) cannot be involved in bandwidth package calculation because a multicast program is a common resource of a PON port. If the IPTV service is involved in ONU overall rate limiting, all multicast users accessing the PON port are affected. Other services such as an Internet access service, a voice service, and a VOD service all use unicast packet transmission and can be involved in the ONU rate limiting package.

In the prior art, a method for ONU overall rate limiting is provided. As shown in FIG. 1, a multicast packet is converted into a unicast packet to be involved in the ONU overall rate limiting. In the technical solution, because each ONU needs to occupy a separate multicast program bandwidth of a PON port, a large quantity of users accessing the PON port request the multicast program on demand, because each ONU needs to occupy a separate multicast program bandwidth of the PON port, resources of the PON port are wasted.

SUMMARY

Technical Problem: The objective of the present disclosure is to provide a method and an apparatus for ONU overall rate limiting, so as to resolve a problem of how to perform real-time rate limiting on an ONU without affecting bandwidth of a PON port.

Technical Solution: According to a first aspect, a method for optical network unit ONU rate limiting is provided, where the method includes: receiving a multicast program sent by a multicast program server; making N+M copies of the multicast program; sending N copies of the multicast program to N passive optical network PON ports that request the multicast program on demand, so as to deliver, by using the PON ports, the multicast program to ONUs that request the multicast program on demand, where N is a quantity of PON ports connecting the ONUs that request the multicast program on demand to an OLT; and sending M copies of the multicast program to M ONU rate limiting units corresponding to M ONUs that request the multicast program on demand, to perform ONU overall rate limiting, and after the ONU overall rate limiting is completed, discarding the M copies of the multicast program, where N and M are integers greater than or equal to 1, and M is a quantity of the ONUs that request the multicast program on demand.

In a first possible implementation manner of the first aspect, the method further includes: creating a first multicast forwarding entry, where the first multicast forwarding entry includes a mapping relationship between the multicast program and the PON ports that request the multicast program on demand; and creating a second multicast forwarding entry, where the second multicast forwarding entry includes a mapping relationship among the multicast program, the PON ports that request the multicast program on demand, and the ONUs that request the multicast program on demand.

In a second possible implementation manner of the first aspect, the making N+M copies of the multicast program specifically includes: querying the first multicast forwarding entry to acquire the quantity of the PON ports that request the multicast program on demand; querying the second multicast forwarding entry to acquire the quantity M of the ONUs that request the multicast program on demand; and making N+M copies of the multicast program according to the quantity of the PON ports and the quantity of the ONUs.

In a third possible implementation manner of the first aspect, the sending N copies of the multicast program to N passive optical network PON ports that request the multicast program on demand specifically includes: querying the first multicast forwarding entry to acquire the PON ports that request the multicast program on demand; and sending, according to the PON ports, the N copies of the multicast program to the N passive optical network PON ports that request the multicast program on demand.

In a fourth possible implementation manner of the first aspect, the sending M copies of the multicast program to M ONU rate limiting units corresponding to M ONUs that request the multicast program on demand specifically includes: querying the second multicast forwarding entry to acquire identifiers of the ONUs that request the multicast program on demand; and sending, according to the identifiers of the ONUs, the M copies of the multicast program to the M ONU rate limiting units corresponding to the M ONUs that request the multicast program on demand.

In a fifth possible implementation manner of the first aspect, the performing ONU overall rate limiting specifically includes: performing, by using a method combining a priority queue and leaky bucket rate limiting or by using a leaky bucket rate limiting method, overall rate limiting on the ONUs that request the multicast program on demand.

According to a second aspect, an optical line terminal OLT is provided, where the OLT includes: a receiving unit, configured to: receive a multicast program sent by a multicast program server, and send the multicast program to a copying unit; the copying unit, configured to: make N+M copies of the multicast program, send N copies of the multicast program to passive optical network PON ports that request the multicast program on demand, and/or send M copies of the multicast program to M ONU rate limiting units corresponding to M optical network units ONUs that request the multicast program on demand, where N and M are integers greater than or equal to 1; multiple PON ports, configured to send the multicast program received from the copying unit to the optical network units ONUs that request the multicast program on demand; and multiple rate limiting units, configured to: separately perform ONU overall rate limiting by using the multicast program received from the copying unit, and after the rate limiting is completed, discard the multicast program.

In a first possible implementation manner of the second aspect, the OLT further includes: a processing unit, configured to create a first multicast forwarding entry and a second multicast forwarding entry, where the first multicast forwarding entry includes a mapping relationship between the multicast program and the PON ports that request the multicast program on demand; and the second multicast forwarding entry includes a mapping relationship among the multicast program, the passive optical network PON ports that request the multicast program on demand, and the ONUs that request the multicast program on demand.

In a second possible implementation manner of the second aspect, the copying unit being configured to make N+M copies of the multicast program specifically includes: querying the first multicast forwarding entry to acquire a quantity of the PON ports that request the multicast program on demand; querying the second multicast forwarding entry to acquire a quantity of the ONUs that request the multicast program on demand; and making N+M copies of the multicast program according to the quantity of the PON ports and the quantity of the ONUs.

In a third possible implementation manner of the second aspect, the copying unit is specifically configured to: query the first multicast forwarding entry to acquire the PON ports that request the multicast program on demand; send, according to the PON ports, the N copies of the multicast program to the N passive optical network PON ports that request the multicast program on demand; query the second multicast forwarding entry to acquire identifiers of the ONUs that request the multicast program on demand; and send, according to the identifiers of the ONUs, the M copies of the multicast program to the M ONU rate limiting units corresponding to the M ONUs that request the multicast program on demand.

In a fourth possible implementation manner of the second aspect, the rate limiting units are specifically configured to: perform, by using a method combining a priority queue and leaky bucket rate limiting or by using a leaky bucket rate limiting method, overall rate limiting on the ONUs that request the multicast program on demand.

According to a third aspect, a passive optical network system is provided, including an optical line terminal OLT, multiple optical network units ONUs or optical network terminals ONTs, and at least one optical distribution network ODN, where the OLT is separately connected to the multiple ONUs or ONTs by using the at least one ODN, and the OLT is the optical line terminal OLT according to claims 6 to 10.

According to a fourth aspect, an optical line terminal OLT is provided, where the OLT is configured to perform the method according to the first aspect or any possible implementation manner of the first aspect.

According to a fifth aspect, a computer program product is provided, where the computer program product includes a read/write storage medium, the storage medium is configured to store a software code instruction, and the software code instruction is used to perform the step according to the first aspect or any possible implementation manner of the first aspect.

Advantageous Effect: In the technical solution, multicast packets of a multicast program are copied and copies of the multicast packets are separately sent to ONU rate limiting units corresponding to ONUs that request the multicast packets on demand, so that the multicast packets are involved in ONU overall rate limiting, and the multicast program is discarded, so that real-time rate limiting is performed on each ONU without affecting bandwidth of a PON.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

The following descriptions are merely exemplary embodiments of the present disclosure, but are not intended to limit the present disclosure. Any modification, equivalent replacement, or improvement made without departing from the spirit and principle of the present disclosure should fall within the protection scope of the present disclosure.

Embodiment 1

This embodiment of the present disclosure provides a method for ONU overall rate limiting, which is applied to a passive optical network system. A passive optical network (PON) is a point-to-multipoint (P2MP) structure. A typical PON network includes two parts: an optical line terminal (OLT), and an optical network unit (ONU) or an optical network terminal (ONT). The OLT is an aggregation device, terminating the PON protocol, placed at a central office end. The ONU and the ONT are user-side units or terminals, providing various interfaces to users, located at a customer end. The OLT and the ONU, or the OLT and the ONT are connected by using the PON to communicate with each other.

The following describes this embodiment of the present disclosure in detail with reference to specific accompanying drawings.

Figure 1:
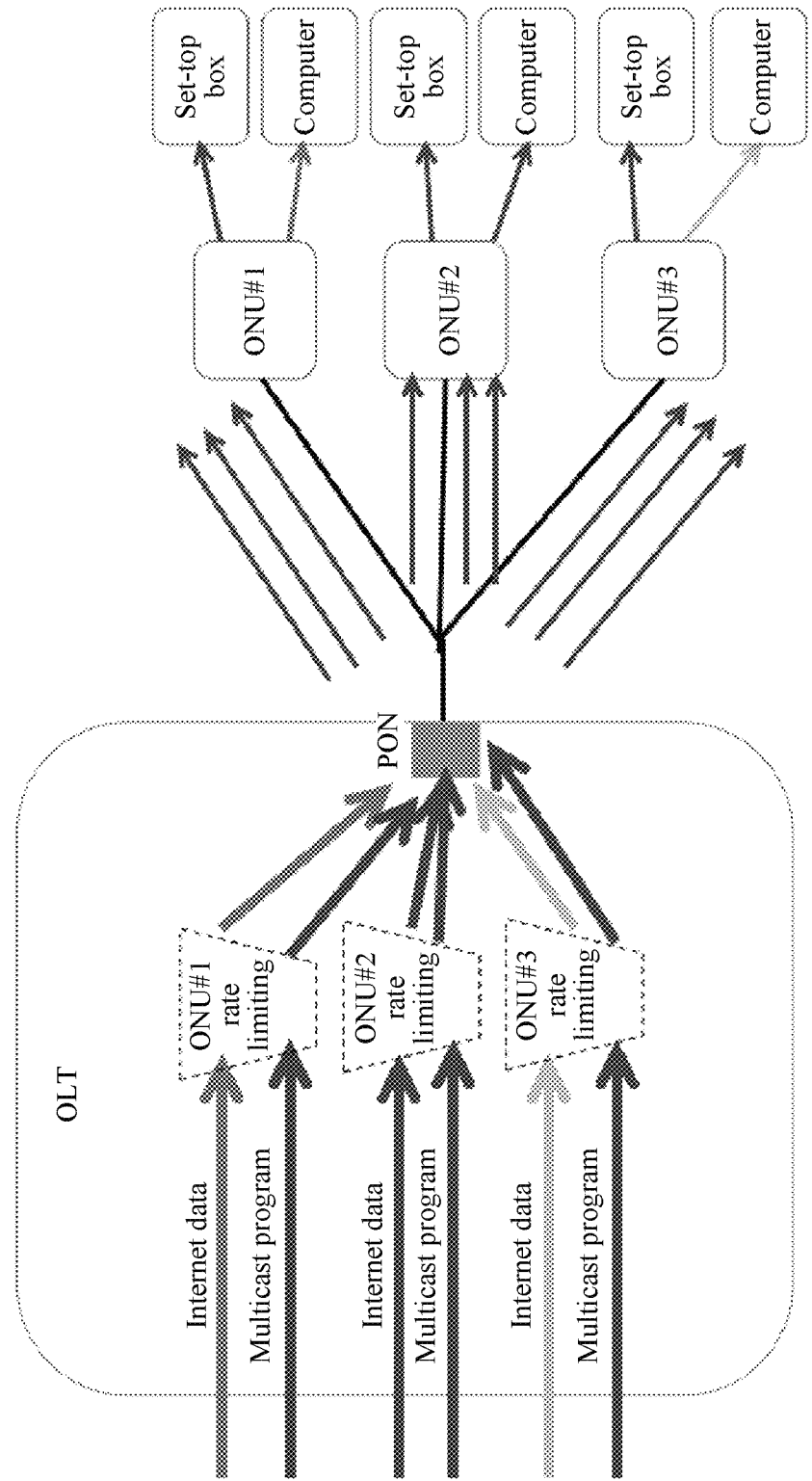
FIG. 1 is a schematic diagram of a method for optical network unit ONU overall rate limiting in the prior art.
Figure 2:
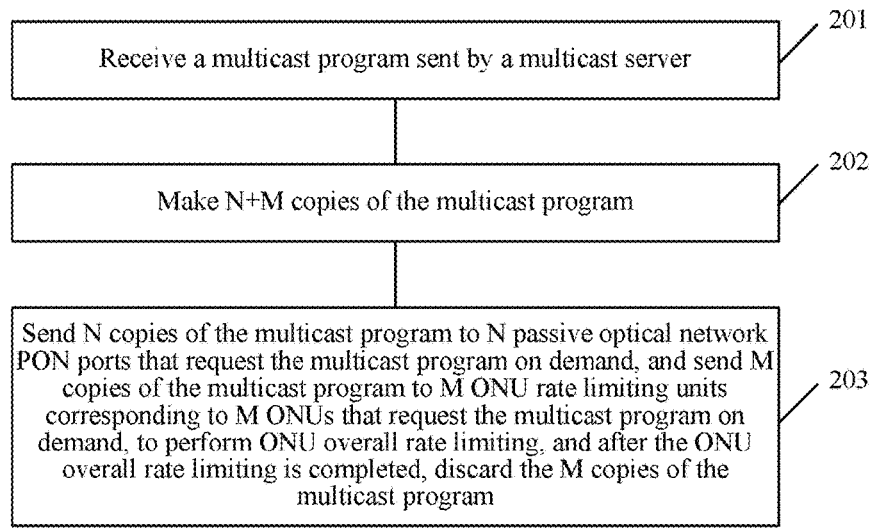
FIG. 2 is a flowchart of a method for optical network unit ONU rate limiting according to an embodiment of the present disclosure.

Referring to FIG. 2, FIG. 2 is a flowchart of a method for optical network unit ONU overall rate limiting according to an embodiment of the present disclosure. As shown in FIG. 2, the method includes the following steps:

Step 201: Receive a multicast program sent by a multicast program server.

Step 202: Make N+M copies of the multicast program.

Step 203: Send N copies of the multicast program to N passive optical network PON ports that request the multicast program on demand, so as to deliver, by using the PON ports, the multicast program to ONUs that request the multicast program on demand, where N is a quantity of PON ports connecting the ONUs that request the multicast program on demand to an OLT, and the PON port is an interface, connected to the ONU, on the OLT; and send M copies of the multicast program to M ONU rate limiting units corresponding to M ONUs that request the multicast program on demand, to perform ONU overall rate limiting, and after the ONU overall rate limiting is completed, discard the M copies of the multicast program, where N and M are integers greater than or equal to 1, and M is a quantity of the ONUs that request the multicast program on demand.

Optionally, before step 202, the method further includes:

detecting, by means of listening, whether an ONU sends a multicast program request packet, where the request packet is an IGMP (Internet Group Management Protocol) join packet; and if it is detected, by means of listening, that the ONU sends the multicast program request packet to the OLT, creating a first multicast forwarding entry, where the first multicast forwarding entry includes at least an identifier of the multicast program and a passive optical network PON port that requests the multicast program on demand.

Specifically, referring to Table 1, a multicast program 1 is requested by a PON#1 on demand and a multicast program 2 is requested by the PON#1 on demand. Multicast program entries recorded in Table 1 and Table 2 may specifically be a multicast program name such as "Dongfanghong"; or may be a multicast program code such as "001"; or may be a parameter that can uniquely characterize a multicast program, such as a multicast program source address, where a multicast program is not limited to being characterized by one parameter, or may be characterized by a combination of two or more parameters, which are generally referred to as a multicast program identifier herein. According to Table 1, a copy of the multicast program 1 is made and sent to the port PON#1, and a copy of the multicast program 2 is made and sent to the port PON#1.

TABLE 1

| Multicast Program Identifier | PON Port Requesting a Multicast Program on Demand |
|---|---|
| Multicast program 1 | PON#1 |
| Multicast program 2 | PON#1 |
| ... | ... |

A second multicast forwarding entry is created, where the second multicast forwarding entry includes at least the identifier of the multicast program, an identifier of the passive optical network PON port that requests the multicast program on demand, and an identifier of the ONU that requests the multicast program on demand.

Specifically, referring to Table 2, the multicast program 1 is requested on demand by an ONU1 connected to the PON1, an ONU2 connected to the PON1, and an ONU1 connected to a PON2; and the multicast program 2 is requested on demand by the ONU2 connected to the PON1. According to Table 2, three copies of the multicast program 1 are made and one copy of the multicast program 2 is made, where two of the three copies of the multicast program 1 are separately sent to rate limiting units corresponding to the ONU#1 and the ONU#2 that are connected to the port PON#1 requesting the multicast program 1 on demand, so that rate limiting is performed, and the multicast program 2 is sent to a rate limiting unit corresponding to the ONU#2 that is connected to the port PON#2 requesting the multicast program 2 on demand, so that rate limiting is performed.

TABLE 2

| Multicast Program Identifier | ONU Requesting a Multicast Program on Demand |
|---|---|
| Multicast program 1 | PON#1ONU#1 |
| Multicast program 1 | PON#1ONU#2 |
| Multicast program 1 | PON#2ONU#1 |
| Multicast program 2 | PON#1ONU#2 |
| ... | ... |

Specifically, the making N+M copies of the multicast program specifically includes:

querying the first multicast forwarding entry to acquire the quantity N of the PON ports that request the multicast program on demand;

querying the second multicast forwarding entry to acquire the quantity M of the ONUs that request the multicast program on demand; and making N+M copies of the multicast program according to the quantity N of the PON ports and the quantity M of the ONUs; or making N copies of the multicast program according to the quantity N of the PON ports first, and then making M copies of the multicast program according to the quantity M of the ONUs; or making M copies of the multicast program according to the quantity M of the ONUs first, and then making N copies of the multicast program according to the quantity N of the PON ports.

Further, a copy of the multicast program may be specifically made by copying data control blocks of packets of the multicast program, or by copying packets of the multicast program.

Still further, a copy of the multicast program may be specifically made by using a hardware circuit, or by using a field programmable gate array (FGPA) or a microcode NP chip.

Optionally, in specific implementation, two sending actions in step 203: the sending N copies of the multicast program to N passive optical network PON ports that request the multicast program on demand and the sending M copies of the multicast program to M ONU rate limiting units corresponding to M ONUs that request the multicast program on demand, to perform ONU overall rate limiting, may be performed simultaneously; or the N copies of the multicast program may be sent to the PON ports first, and then the M copies of the multicast program are sent to the ONU rate limiting units; or the M copies of the multicast program may be sent to the ONU rate limiting units first, and then the N copies of the multicast program are sent to the PON ports. Step 203 is not limited by a sending execution sequence.

Specifically, the sending N copies of the multicast program to N passive optical network PON ports that request the multicast program on demand specifically includes:

querying the first multicast forwarding entry to acquire the PON ports that request the multicast program on demand; and separately sending, according to the PON ports, the copies of the multicast program to the PON ports.

Specifically, the sending M copies of the multicast program to M ONU rate limiting units corresponding to M ONUs that request the multicast program on demand specifically includes:

querying the second multicast forwarding entry to acquire identifiers of the ONUs that request the multicast program on demand; and separately sending, according to the identifiers of the ONUs, the copies of the multicast program to the ONU rate limiting units corresponding to the ONUs.

Specifically, the OLT includes at least one PON port, one PON port is connected to at least one ONU, one ONU is connected to at least one set-top box, and at least one ONU rate limiting unit is connected to the PON port, where the ONU rate limiting unit and the ONU are in a one-to-one correspondence. Therefore, when finding that an ONU requests the multicast program on demand, the OLT makes a copy of packets of the multicast program and sends the copy to an ONU rate limiting unit that corresponds to the ONU, so that the multicast program packets are involved in the ONU overall rate limiting.

Specifically, the performing ONU rate limiting on the multicast program specifically includes:

performing, by using a method combining a priority queue and leaky bucket rate limiting or by using a leaky bucket rate limiting method, overall rate limiting on the ONUs that request the multicast program on demand.

The leaky bucket rate limiting method may be a Single Rate Three Color Marker rate limiting method or a Two Rate Three Color Marker rate limiting method.

Figure 3:
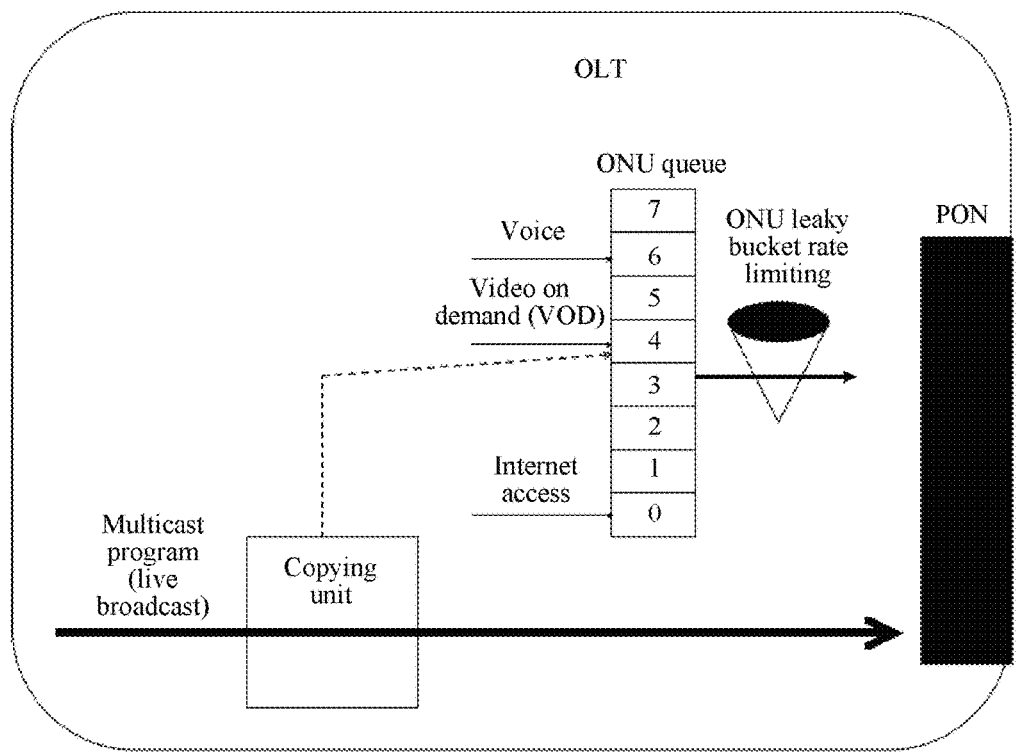
FIG. 3 is a method schematic diagram of a specific ONU rate limiting algorithm according to an embodiment of the present disclosure.

Specifically, referring to FIG. 3, FIG. 3 is a schematic diagram of an ONU overall rate limiting method combining a priority queue and leaky bucket rate limiting according to an embodiment of the present disclosure. When ONU rate limiting is implemented by using the method combining a priority queue and leaky bucket rate limiting, generally, there are eight priority queues. For example, an ONU carries four services, including an Internet access service, an on-demand service, a voice service, and an IPTV service. The Internet access service, the on-demand service, and the voice service use unicast packet transmission, and the IPTV service uses multicast packet transmission. The four services separately enter different queues by using different priorities, where different services correspond to different priorities, and the priorities may be preset by using software or set by using hardware, or the set priorities may be modified. A rate at an egress is limited by using a leaky bucket algorithm, where the leaky bucket algorithm may be a Single Rate Three Color Marker algorithm (srTCM), or may be a Two Rate Three Color Marker algorithm. For the Single Rate Three Color Marker algorithm, refer to descriptions in RFC 2697, and for the Two Rate Three Color Marker algorithm, refer to descriptions in RFC 2698.

Figure 4:
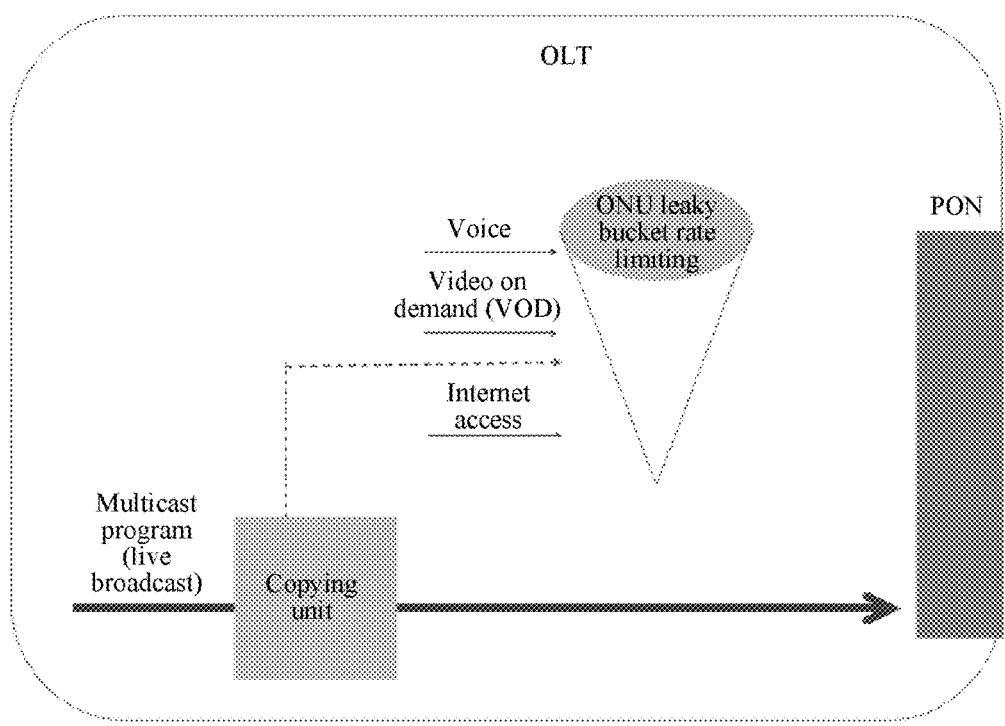
FIG. 4 is a method schematic diagram of another specific ONU rate limiting algorithm according to an embodiment of the present disclosure.

Referring to FIG. 4, FIG. 4 is a schematic diagram of another method for performing ONU rate limiting by using a leaky bucket rate limiting algorithm according to an embodiment of the present disclosure. As shown in FIG. 4, a copying unit is configured to make a copy of a multicast program, and perform ONU rate limiting on the multicast program by using a leaky bucket rate limiting method. The leaky bucket algorithm may be a Single Rate Three Color Marker algorithm (srTCM), or may be a Two Rate Three Color Marker algorithm. For the Single Rate Three Color Marker algorithm, refer to descriptions in RFC 2697, and for the Two Rate Three Color Marker algorithm, refer to descriptions in RFC 2698.

This embodiment of the present disclosure provides a method for ONU overall rate limiting, and in the method, multicast packets of a multicast program are copied and copies of the multicast packets are separately sent to ONU rate limiting units corresponding to ONUs that request the multicast packets on demand, so that the multicast packets are involved in the ONU overall rate limiting, and after the rate limiting is performed on the multicast program, the multicast program is discarded, so that real-time rate limiting is performed on each ONU without affecting bandwidth of a PON.

Embodiment 2

Figure 5:
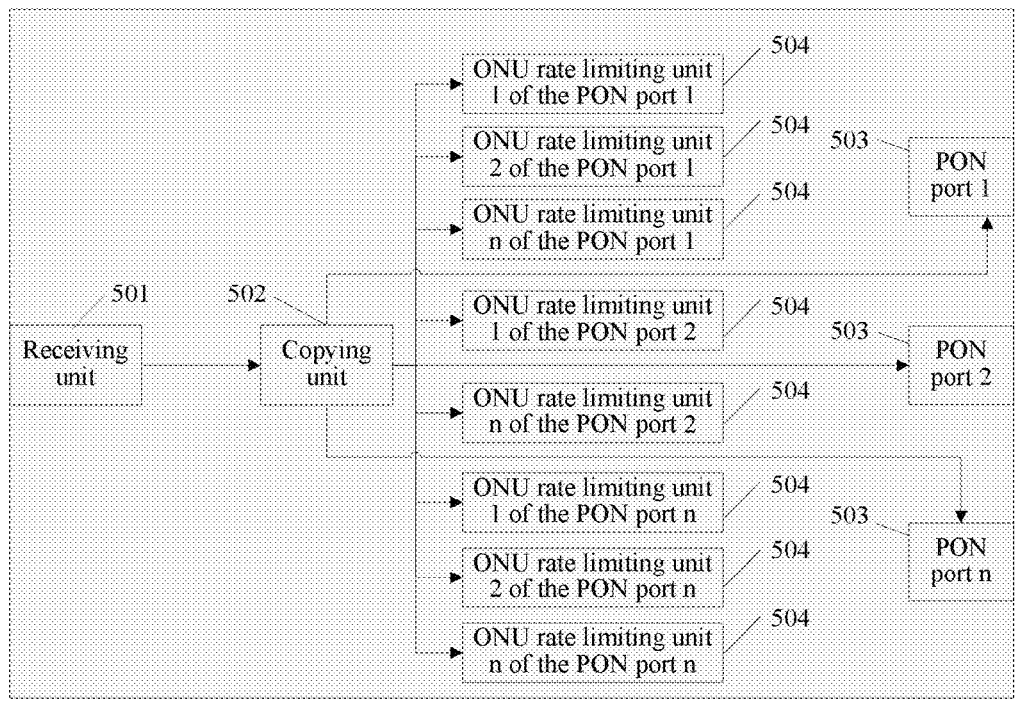
FIG. 5 is a schematic structural diagram of an OLT according to an embodiment of the present disclosure.

Referring to FIG. 5, FIG. 5 is an apparatus structural diagram of an OLT according to an embodiment of the present disclosure. As shown in FIG. 5, in FIG. 5, the OLT includes multiple PON ports, and multiple ONUs are connected to each PON port, where each ONU corresponds to a particular ONU rate limiting unit. The OLT includes:

a receiving unit 501, configured to: receive a multicast program sent by a multicast program server, and send the multicast program to a copying unit 502;

the copying unit 502, configured to: make N+M copies of the multicast program, send N copies of the multicast program to passive optical network PON ports that request the multicast program on demand, and/or send M copies of the multicast program to ONU rate limiting units 504 corresponding to optical network units ONUs that request the multicast program on demand;

multiple PON ports 503, configured to send the multicast program received from the copying unit 502 to the optical network units ONUs that request the multicast program on demand and that are connected to the OLT; and multiple rate limiting units 504, configured to: separately perform ONU overall rate limiting on the multicast program received from the copying unit 502, and after the rate limiting is completed, discard the multicast program.

Optionally, the OLT further includes:

a listening unit 505, configured to detect, by means of listening, whether an ONU sends a multicast program request packet, where the request packet is an IGMP (Internet Group Management Protocol) join packet.

Optionally, the OLT further includes:

a processing unit 506, configured to: if it is detected, by means of listening, that the ONU sends a multicast program request packet to the OLT, create a first multicast forwarding entry, where the first multicast forwarding entry includes at least an identifier of the multicast program and a passive optical network PON port that requests the multicast program on demand.

Specifically, referring to Table 1, a multicast program 1 is requested by a PON#1 on demand, and a multicast program 2 is requested by the PON#1 on demand. Multicast program entries recorded in Table 1 and Table 2 may specifically be a multicast program name such as "Dongfanghong"; or may be a multicast program code such as "001"; or may be a parameter that can uniquely characterize a multicast program, such as a multicast program source address, where a multicast program is not limited to being characterized by one parameter, or may be characterized by a combination of two or more parameters, which are generally referred to as a multicast program identifier herein. According to Table 1, the OLT sends the multicast program 1 to the PON1, and sends the multicast program 2 to the PON1.

TABLE 1

| Multicast Program Identifier | ONU Requesting a Multicast Program on Demand |
|---|---|
| Multicast program 1 | PON#1 |
| Multicast program 2 | PON#1 |
| ... | ... |

A second multicast forwarding entry is created, where the second multicast forwarding entry includes at least the identifier of the multicast program, an identifier of the passive optical network PON port that requests the multicast program on demand, and an identifier of the ONU that requests the multicast program on demand.

Specifically, referring to Table 2, the multicast program 1 is requested on demand by an ONU 1 connected to the PON#1, an ONU 2 connected to the PON#1, and an ONU 1 connected to a PON#2; and the multicast program 2 is requested on demand by the ONU 2 connected to the PON#1. According to Table 2, three copies of the multicast program 1 are made and one copy of the multicast program 2 is made, where two of the three copies of the multicast program 1 are separately sent to rate limiting units corresponding to the ONU#1 and the ONU#2 that are connected to the port PON#1 requesting the multicast program 1 on demand, so that rate limiting is performed, and the multicast program 2 is sent to a rate limiting unit corresponding to the ONU#2 that is connected to the port PON#2 requesting the multicast program 2 on demand, so that rate limiting is performed.

TABLE 2

| Multicast Program Identifier | ONU Requesting a Multicast Program on Demand |
|---|---|
| Multicast program 1 | PON#1ONU#1 |
| Multicast program 1 | PON#1ONU#2 |
| Multicast program 1 | PON#2ONU#1 |
| Multicast program 2 | PON#1ONU#2 |
| ... | ... |

Specifically, the copying unit 502 being configured to make N+M copies of the multicast program specifically includes:

querying the first multicast forwarding entry to acquire a quantity N of the PON ports that request the multicast program on demand;

querying the second multicast forwarding entry to acquire a quantity M of the ONUs that request the multicast program on demand; and making N+M copies of the multicast program according to the quantity N of the PON ports and the quantity M of the ONUs; or making N copies of the multicast program according to the quantity N of the PON ports first, and then making M copies of the multicast program according to the quantity M of the ONUs; or making M copies of the multicast program according to the quantity M of the ONUs first, and then making N copies of the multicast program according to the quantity N of the PON ports.

Further, a copy of the multicast program may be specifically made by copying data control blocks of packets of the multicast program, or by copying packets of the multicast program.

A copy of the multicast program may be specifically made by using a hardware circuit, or by using a software program. If a copy of the multicast program is made by using a hardware circuit, a field programmable gate array (FGPA) or a microcode NP chip may be used.

Specifically, the copying unit 502 is specifically configured to:

query the first multicast forwarding entry to acquire the PON ports that request the multicast program on demand;

separately send, according to the PON ports, the copies of the multicast program to the PON ports that request the multicast program on demand;

query the second multicast forwarding entry to acquire identifiers of the ONUs that request the multicast program on demand; and separately send, according to the identifiers of the ONUs, the copies of the multicast program to the ONU rate limiting units corresponding to the ONUs that request the multicast program on demand.

Specifically, the OLT includes at least one PON port, one PON port is connected to at least one ONU, one ONU is connected to at least one set-top box, and at least one ONU rate limiting unit is connected to the PON port, where the ONU rate limiting unit and the ONU are in a one-to-one correspondence. Therefore, when the OLT finds that an ONU requests the multicast program on demand, the copying unit 502 makes a copy of packets of the multicast program and sends the copy to an ONU rate limiting unit that corresponds to the ONU, so that the multicast program packets are involved in the ONU overall rate limiting.

Specifically, the rate limiting unit 504 is specifically configured to:

perform, by using a method combining a priority queue and leaky bucket rate limiting or by using a leaky bucket rate limiting method, overall rate limiting on the ONUs that request the multicast program on demand.

The leaky bucket rate limiting method may be a Single Rate Three Color Marker rate limiting method or a Two Rate Three Color Marker rate limiting method.

Specifically, referring to FIG. 3, FIG. 3 is a schematic diagram of an ONU overall rate limiting method combining a priority queue and leaky bucket rate limiting according to an embodiment of the present disclosure. When ONU rate limiting is implemented by using the method combining a priority queue and leaky bucket rate limiting, generally, there are eight priority queues. For example, an ONU carries four services, including an Internet access service, an on-demand service, a voice service, and an IPTV service. The Internet access service, the on-demand service, and the voice service use unicast packet transmission, and the IPTV service uses multicast packet transmission. The four services separately enter different queues by using different priorities, where different services correspond to different priorities, and the priorities may be preset by using software or set by using hardware, or the set priorities may be modified. A rate at an egress is limited by using a leaky bucket algorithm, where the leaky bucket algorithm may be a Single Rate Three Color Marker algorithm (srTCM), or may be a Two Rate Three Color Marker algorithm. For the Single Rate Three Color Marker algorithm, refer to descriptions in RFC 2697, and for the Two Rate Three Color Marker algorithm, refer to descriptions in RFC 2698.

Referring to FIG. 4, FIG. 4 is a schematic diagram of another method for performing ONU rate limiting by using a leaky bucket rate limiting algorithm according to an embodiment of the present disclosure. As shown in FIG. 4, the copying unit is configured to make a copy of a multicast program, and perform ONU rate limiting on the multicast program by using a leaky bucket rate limiting method. The leaky bucket algorithm may be a Single Rate Three Color Marker algorithm (srTCM), or may be a Two Rate Three Color Marker algorithm. For the Single Rate Three Color Marker algorithm, refer to descriptions in RFC 2697, and for the Two Rate Three Color Marker algorithm, refer to descriptions in RFC 2698.

This embodiment of the present disclosure provides a device for involving a multicast program in ONU overall rate limiting. In the device, multicast packets of a multicast program are copied and copies of the multicast packets are separately sent to ONU rate limiting units corresponding to ONUs that request the multicast packets on demand, so that the multicast packets are involved in the ONU overall rate limiting, and after the ONU overall rate limiting is performed on the multicast program, the multicast program is discarded, so that real-time rate limiting is performed on each ONU without affecting bandwidth of a PON.

Embodiment 3

Figure 6:
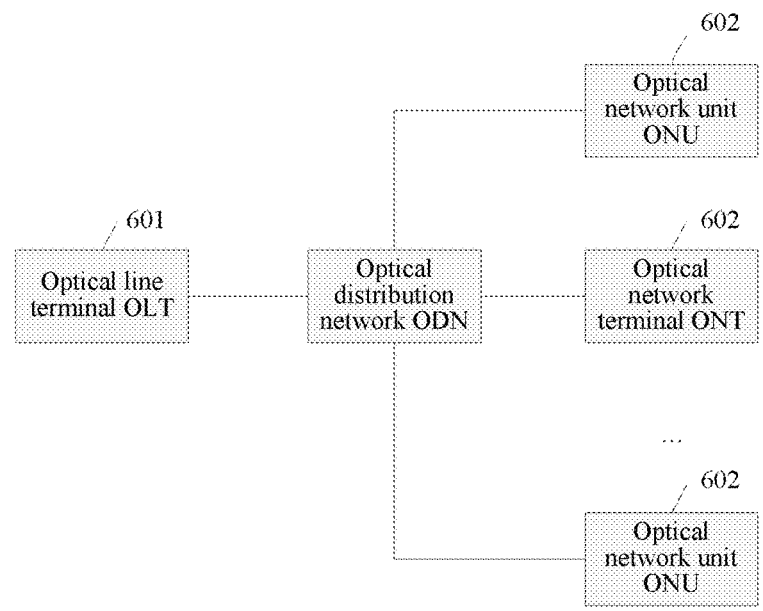
FIG. 6 is a schematic structural diagram of a passive optical network system according to an embodiment of the present disclosure.

Referring to FIG. 6, FIG. 6 is a structural diagram of a passive optical network system according to an embodiment of the present disclosure. As shown in FIG. 6, the passive optical network system includes: an optical network unit 601 and an optical line terminal 602, where the optical network unit 601 is connected to the optical line terminal 602 by using an optical distribution network ODN, and at least one optical network unit 601 is connected to the optical line terminal 602.

For a structure of the optical line terminal 602, refer to the description of the optical line terminal in FIG. 5, and details are not described herein again.

This embodiment of the present disclosure provides a system for involving a multicast program in ONU overall rate limiting. In the system, a copy of a multicast program is separately sent to each optical network unit ONU that requests the multicast program, so that the multicast program is involved in the ONU overall rate limiting, and after the ONU overall rate limiting is performed on the multicast program, the multicast program is discarded, so that real-time rate limiting is performed on each ONU without affecting bandwidth of a PON.

Embodiment 4

Figure 7:
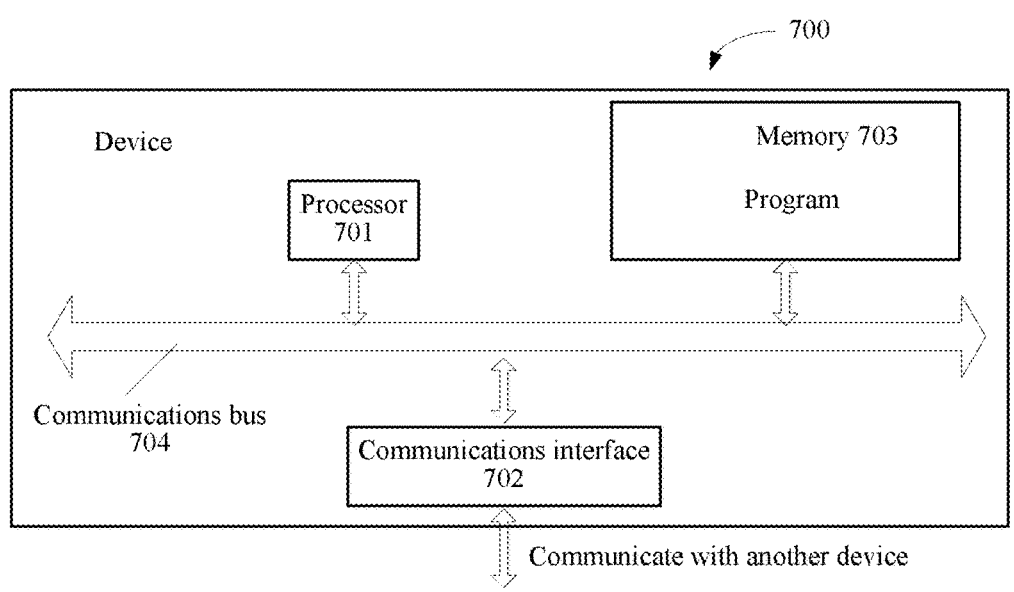
FIG. 7 is a schematic structural diagram of an OLT according to an embodiment of the present disclosure.

FIG. 7 is an apparatus structural diagram of a device according to an embodiment of the present disclosure. Referring to FIG. 7, FIG. 7 shows a device 700 provided by this embodiment of the present disclosure, and specific embodiments of the present disclosure do not limit specific implementation of the device. The device 700 includes:

a processor 701, a communications interface 702, a memory 703, and a bus 704.

The processor 701, the communications interface 702, and the memory 703 communicate with each other by using the bus 704.

The communications interface 702 is configured to communicate with another communications device.

The processor 701 is configured to execute a program.

Specifically, the program may include program code, and the program code includes a computer operation instruction.

The processor 701 may be a central processing unit (CPU) or an application specific integrated circuit ASIC (Application Specific Integrated Circuit), or may be configured as one or more integrated circuits that implement the embodiments of the present application.

The memory 703 is configured to store a program. The memory 703 may be a volatile memory, such as a random access memory (RAM), or a non-volatile memory, such as a read-only memory (ROM), a flash memory, a hard disk drive (HDD), or a solid state disk (SSD). The processor 701 performs the following method according to program instructions stored in the memory 703:

receiving a multicast program sent by a multicast program server;

making N+M copies of the multicast program;

sending N copies of the multicast program to N passive optical network PON ports that request the multicast program on demand, so as to deliver, by using the PON ports, the multicast program to ONUs that request the multicast program on demand, where N is a quantity of PON ports connecting the ONUs that request the multicast program on demand to an OLT; and sending M copies of the multicast program to M ONU rate limiting units corresponding to M ONUs that request the multicast program on demand, to perform ONU overall rate limiting, and after the ONU overall rate limiting is completed, discarding the M copies of the multicast program, where N and M are integers greater than or equal to 1, and M is a quantity of the ONUs that request the multicast program on demand.

Optionally, before the copying the multicast program, the method further includes:

detecting, by means of listening, whether an ONU sends a multicast program request packet, where the request packet is an IGMP (Internet Group Management Protocol) join packet; and if it is detected, by means of listening, that the ONU sends the multicast program request packet to the OLT, creating a first multicast forwarding entry, where the first multicast forwarding entry includes at least an identifier of the multicast program and a passive optical network PON port that requests the multicast program on demand.

Specifically, referring to Table 1, a multicast program 1 is requested by a PON#1 on demand and a multicast program 2 is requested by the PON#1 on demand. Multicast program entries recorded in Table 1 and Table 2 may specifically be a multicast program name such as "Dongfanghong"; or may be a multicast program code such as "001"; or may be a parameter that can uniquely characterize a multicast program, such as a multicast program source address, where a multicast program is not limited to being characterized by one parameter, or may be characterized by a combination of two or more parameters, which are generally referred to as a multicast program identifier herein. According to Table 1, the OLT sends the multicast program 1 to the PON1, and sends the multicast program 2 to the PON1.

TABLE 1

| Multicast Program Identifier | PON Port Requesting a Multicast Program on Demand |
|---|---|
| Multicast program 1 | PON#1 |
| Multicast program 2 | PON#1 |
| ... | ... |

A second multicast forwarding entry is created, where the second multicast forwarding entry includes at least the identifier of the multicast program, an identifier of the passive optical network PON port that requests the multicast program on demand, and an identifier of the ONU that requests the multicast program on demand.

Specifically, referring to Table 2, the multicast program 1 is requested on demand by an ONU 1 connected to the PON#1, an ONU 2 connected to the PON#1, and an ONU 1 connected to a PON#2; and the multicast program 2 is requested on demand by the ONU 2 connected to the PON#1. According to Table 2, three copies of the multicast program 1 are made and one copy of the multicast program 2 is made, where two of the three copies of the multicast program 1 are separately sent to rate limiting units corresponding to the ONU#1 and the ONU#2 that are connected to the port PON#1 requesting the multicast program 1 on demand, so that rate limiting is performed, and the multicast program 2 is sent to a rate limiting unit corresponding to the ONU#2 that is connected to the port PON#2 requesting the multicast program 2 on demand, so that rate limiting is performed.

TABLE 2

| Multicast Program Identifier | ONU Requesting a Multicast Program on Demand |
|---|---|
| Multicast program 1 | PON#1ONU#1 |
| Multicast program 1 | PON#1ONU#2 |
| Multicast program 1 | PON#2ONU#1 |
| Multicast program 2 | PON#1ONU#2 |
| ... | ... |

Specifically, the making N+M copies of the multicast program specifically includes:

querying the first multicast forwarding entry to acquire the quantity N of the PON ports that request the multicast program on demand;

querying the second multicast forwarding entry to acquire the quantity M of the ONUs that request the multicast program on demand; and making N+M copies of the multicast program according to the quantity N of the PON ports and the quantity M of the ONUs; or making N copies of the multicast program according to the quantity N of the PON ports first, and then making M copies of the multicast program according to the quantity M of the ONUs; or making M copies of the multicast program according to the quantity M of the ONUs first, and then making N copies of the multicast program according to the quantity N of the PON ports.

Further, a copy of the multicast program may be specifically made by copying data control blocks of packets of the multicast program, or by copying packets of the multicast program.

A copy of the multicast program may be specifically made by using a hardware circuit, or by using a software program.

If a copy of the multicast program is made by using a hardware circuit, a field programmable gate array (FGPA) or a microcode NP chip may be used.

Specifically, the sending N copies of the multicast program to N passive optical network PON ports that request the multicast program on demand specifically includes:

querying the first multicast forwarding entry to acquire the PON ports that request the multicast program on demand; and separately sending, according to the PON ports, the copies of the multicast program to the PON ports.

Specifically, the sending M copies of the multicast program to M ONU rate limiting units corresponding to M ONUs that request the multicast program on demand specifically includes:

querying the second multicast forwarding entry to acquire identifiers of the ONUs that request the multicast program on demand; and separately sending, according to the identifiers of the ONUs, the copies of the multicast program to the ONU rate limiting units corresponding to the ONUs.

Specifically, the OLT includes at least one PON port, one PON port is connected to at least one ONU, one ONU is connected to at least one set-top box, and at least one ONU rate limiting unit is connected to the PON port, where the ONU rate limiting unit and the ONU are in a one-to-one correspondence. Therefore, when finding that an ONU requests the multicast program on demand, the OLT makes a copy of packets of the multicast program and sends the copy to an ONU rate limiting unit that corresponds to the ONU, so that the multicast program is involved in the ONU overall rate limiting.

Specifically, the performing ONU rate limiting on the multicast program specifically includes:

performing, by using a method combining a priority queue and leaky bucket rate limiting or by using a leaky bucket rate limiting method, overall rate limiting on the ONUs that request the multicast program on demand.

The leaky bucket rate limiting method may be a Single Rate Three Color Marker rate limiting method or a Two Rate Three Color Markerrate limiting method.

Specifically, referring to FIG. 3, FIG. 3 is a schematic diagram of an ONU overall rate limiting method combining a priority queue and leaky bucket rate limiting according to an embodiment of the present disclosure. When ONU rate limiting is implemented by using the method combining a priority queue and leaky bucket rate limiting, generally, there are eight priority queues. For example, an ONU carries four services, including an Internet access service, an on-demand service, a voice service, and an IPTV service. The Internet access service, the on-demand service, and the voice service use unicast packet transmission, and the IPTV service uses multicast packet transmission. The four services separately enter different queues by using different priorities, where different services correspond to different priorities, and the priorities may be preset by using software or set by using hardware, or the set priorities may be modified. A rate at an egress is limited by using a leaky bucket algorithm, where the leaky bucket algorithm may be a Single Rate Three Color Marker algorithm (srTCM), or may be a Two Rate Three Color Marker algorithm. For the Single Rate Three Color Marker algorithm, refer to descriptions in RFC 2697, and for the Two Rate Three Color Marker algorithm, refer to descriptions in RFC 2698.

Referring to FIG. 4, FIG. 4 is a schematic diagram of another method for performing ONU rate limiting by using a leaky bucket rate limiting algorithm according to an embodiment of the present disclosure. As shown in FIG. 4, a copying unit is configured to make a copy of a multicast program, and perform ONU rate limiting on the multicast program by using a leaky bucket rate limiting method. The leaky bucket algorithm may be a Single Rate Three Color Marker algorithm (srTCM), or may be a Two Rate Three Color Marker algorithm. For the Single Rate Three Color Marker algorithm, refer to descriptions in RFC 2697, and for the Two Rate Three Color Marker algorithm, refer to descriptions in RFC 2698.

This embodiment of the present disclosure provides a device for involving a multicast program in ONU overall rate limiting. In the device, multicast packets of a multicast program are copied and copies of the multicast packets are separately sent to ONU rate limiting units corresponding to ONUs that request the multicast packets on demand, so that the multicast packets are involved in the ONU overall rate limiting, and after the ONU overall rate limiting is performed on the multicast program, the multicast program is discarded, so that real-time rate limiting is performed on each ONU without affecting bandwidth of a PON.

Embodiment 5

This embodiment of the present disclosure provides a computer program product, where the computer program product includes a read/write storage medium, where the storage medium is configured to store a software code instruction, and the software code instruction is used to perform the following steps:

receiving a multicast program sent by a multicast program server;

making N+M copies of the multicast program;

sending N copies of the multicast program to N passive optical network PON ports that request the multicast program on demand, so as to deliver, by using the PON ports, the multicast program to ONUs that request the multicast program on demand, where N is a quantity of PON ports connecting the ONUs that request the multicast program on demand to an OLT; and sending M copies of the multicast program to M ONU rate limiting units corresponding to M ONUs that request the multicast program on demand, to perform ONU overall rate limiting, and after the ONU overall rate limiting is completed, discarding the M copies of the multicast program, where N and M are integers greater than or equal to 1, and M is a quantity of the ONUs that request the multicast program on demand.

Optionally, before the copying the multicast program, the method further includes:

detecting, by means of listening, whether an ONU sends a multicast program request packet, where the request packet is an IGMP (Internet Group Management Protocol) join packet; and if it is detected, by means of listening, that the ONU sends the multicast program request packet to the OLT, creating a first multicast forwarding entry, where the first multicast forwarding entry includes at least an identifier of the multicast program and a passive optical network PON port that requests the multicast program on demand.

Specifically, referring to Table 1, a multicast program 1 is requested by a PON#1 on demand and a multicast program 2 is requested by the PON#1 on demand. Multicast program entries recorded in Table 1 and Table 2 may specifically be a multicast program name such as "Dongfanghong"; or may be a multicast program code such as "001"; or may be a parameter that can uniquely characterize a multicast program, such as a multicast program source address, where a multicast program is not limited to being characterized by one parameter, or may be characterized by a combination of two or more parameters, which are generally referred to as a multicast program identifier herein. According to Table 1, the OLT sends the multicast program 1 to the PON1, and sends the multicast program 2 to the PON1.

TABLE 1

| Multicast Program Identifier | PON Port Requesting a Multicast Program on Demand |
|---|---|
| Multicast program 1 | PON#1 |
| Multicast program 2 | PON#1 |
| ... | ... |

A second multicast forwarding entry is created, where the second multicast forwarding entry includes at least the identifier of the multicast program, an identifier of the passive optical network PON port that requests the multicast program on demand, and an identifier of the ONU that requests the multicast program on demand.

Specifically, referring to Table 2, the multicast program 1 is requested on demand by an ONU 1 connected to the PON#1, an ONU 2 connected to the PON#1, and an ONU 1 connected to a PON#2; and the multicast program 2 is requested on demand by the ONU 2 connected to the PON#1. According to Table 2, three copies of the multicast program 1 are made and one copy of the multicast program 2 is made, where two of the three copies of the multicast program 1 are separately sent to rate limiting units corresponding to the ONU#1 and the ONU#2 that are connected to the port PON#1 requesting the multicast program 1 on demand, so that rate limiting is performed, and the multicast program 2 is sent to a rate limiting unit corresponding to the ONU#2 that is connected to the port PON#2 requesting the multicast program 2 on demand, so that rate limiting is performed.

TABLE 2

| Multicast Program Identifier | ONU Requesting a Multicast Program on Demand |
|---|---|
| Multicast program 1 | PON#1ONU#1 |
| Multicast program 1 | PON#1ONU#2 |
| Multicast program 1 | PON#2ONU#1 |
| Multicast program 2 | PON#1ONU#2 |
| ... | ... |

Specifically, the making N+M copies of the multicast program specifically includes:

querying the first multicast forwarding entry to acquire the quantity N of the PON ports that request the multicast program on demand;

querying the second multicast forwarding entry to acquire the quantity M of the ONUs that request the multicast program on demand; and making N+M copies of the multicast program according to the quantity N of the PON ports and the quantity M of the ONUs; or making N copies of the multicast program according to the quantity N of the PON ports first, and then making M copies of the multicast program according to the quantity M of the ONUs; or making M copies of the multicast program according to the quantity M of the ONUs first, and then making N copies of the multicast program according to the quantity N of the PON ports.

Further, a copy of the multicast program may be specifically made by copying data control blocks of packets of the multicast program, or by copying packets of the multicast program.

A copy of the multicast program may be specifically made by using a hardware circuit, or by using a software program. If a copy of the multicast program is made by using a hardware circuit, a field programmable gate array (FGPA) or a microcode NP chip may be used.

Specifically, the sending N copies of the multicast program to N passive optical network PON ports that request the multicast program on demand specifically includes:

querying the first multicast forwarding entry to acquire the PON ports that request the multicast program on demand; and separately sending, according to the PON ports, the copies of the multicast program to the PON ports.

Specifically, the sending M copies of the multicast program to M ONU rate limiting units corresponding to M ONUs that request the multicast program on demand specifically includes:

querying the second multicast forwarding entry to acquire identifiers of the ONUs that request the multicast program on demand; and separately sending, according to the identifiers of the ONUs, the copies of the multicast program to the ONU rate limiting units corresponding to the ONUs.

Specifically, the OLT includes at least one PON port, one PON port is connected to at least one ONU, one ONU is connected to at least one set-top box, and at least one ONU rate limiting unit is connected to the PON port, where the ONU rate limiting unit and the ONU are in a one-to-one correspondence. Therefore, when finding that an ONU requests the multicast program on demand, the OLT makes a copy of packets of the multicast program and sends the copy to an ONU rate limiting unit that corresponds to the ONU, so that the multicast program is involved in the ONU overall rate limiting.

Specifically, the performing ONU rate limiting on the multicast program specifically includes:

performing, by using a method combining a priority queue and leaky bucket rate limiting or by using a leaky bucket rate limiting method, overall rate limiting on the ONUs that request the multicast program on demand.

The leaky bucket rate limiting method may be a Single Rate Three Color Marker rate limiting method or a Two Rate Three Color Marker rate limiting method.

Specifically, referring to FIG. 3, FIG. 3 is a schematic diagram of an ONU overall rate limiting method combining a priority queue and leaky bucket rate limiting according to an embodiment of the present disclosure. When ONU rate limiting is implemented by using the method combining a priority queue and leaky bucket rate limiting, generally, there are eight priority queues. For example, an ONU carries four services, including an Internet access service, an on-demand service, a voice service, and an IPTV service. The Internet access service, the on-demand service, and the voice service use unicast packet transmission, and the IPTV service uses multicast packet transmission. The four services separately enter different queues by using different priorities, where different services correspond to different priorities, and the priorities may be preset by using software or set by using hardware, or the set priorities may be modified. A rate at an egress is limited by using a leaky bucket algorithm, where the leaky bucket algorithm may be a Single Rate Three Color Marker algorithm (srTCM), or may be a Two Rate Three Color Marker algorithm. For the Single Rate Three Color Marker algorithm, refer to descriptions in RFC 2697, and for the Two Rate Three Color Marker algorithm, refer to descriptions in RFC 2698.

Referring to FIG. 4, FIG. 4 is a schematic diagram of another method for performing ONU rate limiting by using a leaky bucket rate limiting algorithm according to an embodiment of the present disclosure. As shown in FIG. 4, a copying unit is configured to make a copy of a multicast program, and perform ONU rate limiting on the multicast program by using a leaky bucket rate limiting method. The leaky bucket algorithm may be a Single Rate Three Color Marker algorithm (srTCM), or may be a Two Rate Three Color Marker algorithm. For the Single Rate Three Color Marker algorithm, refer to descriptions in RFC 2697, and for the Two Rate Three Color Marker algorithm, refer to descriptions in RFC 2698.

This embodiment of the present disclosure provides a computer program product, where the computer program product includes a read/write storage medium, where the storage medium is configured to store a software code instruction, and by performing the foregoing steps by using the software code instruction, multicast packets of a multicast program are copied and copies of the multicast packets are separately sent to ONU rate limiting units corresponding to ONUs that request the multicast packets on demand, so that the multicast packets are involved in ONU overall rate limiting, and after the rate limiting is performed on the multicast program, the multicast program is discarded, so that real-time rate limiting is performed on each ONU without affecting bandwidth of a PON.

The foregoing descriptions are merely preferred implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A method for optical network unit ONU overall rate limiting, performed by an optical line terminal OLT, wherein the method comprises:
   receiving a multicast program sent by a multicast program server;
   making N+M copies of the multicast program;
   sending N copies of the multicast program to N passive optical network PON ports that request the multicast program on demand, so as to deliver, by using the PON ports, the multicast program to ONUs that request the multicast program on demand, wherein N is a quantity of PON ports connecting the ONUs that request the multicast program on demand to the OLT; and
   sending M copies of the multicast program to M ONU rate limiting units corresponding to M ONUs that request the multicast program on demand, to perform ONU overall rate limiting, and after the ONU overall rate limiting is completed, discarding the M copies of the multicast program, wherein N and M are integers greater than or equal to 1, and M is a quantity of the ONUs that request the multicast program on demand.

2. The method according to claim 1, wherein the method further comprises:
   creating a first multicast forwarding entry, wherein the first multicast forwarding entry comprises a mapping relationship between the multicast program and the PON ports that request the multicast program on demand; and creating a second multicast forwarding entry, wherein the second multicast forwarding entry comprises a mapping relationship among the multicast program, the PON ports that request the multicast program on demand, and the ONUs that request the multicast program on demand.

3. The method according to claim 2, wherein the making N+M copies of the multicast program comprises:
querying the first multicast forwarding entry to acquire the quantity N of the PON ports that request the multicast program on demand;
querying the second multicast forwarding entry to acquire the quantity M of the ONUs that request the multicast program on demand; and
making N+M copies of the multicast program according to the quantity of the PON ports and the quantity of the ONUs.

4. The method according to claim 2, wherein the sending N copies of the multicast program to N passive optical network PON ports that request the multicast program on demand comprises:
querying the first multicast forwarding entry to acquire the PON ports that request the multicast program on demand; and
sending, according to the PON ports, the N copies of the multicast program to the N passive optical network PON ports that request the multicast program on demand.

5. The method according to claim 1, wherein the sending M copies of the multicast program to M ONU rate limiting units corresponding to M ONUs that request the multicast program on demand comprises:
querying the second multicast forwarding entry to acquire identifiers of the ONUs that request the multicast program on demand; and
sending, according to the identifiers of the ONUs, the M copies of the multicast program to the M ONU rate limiting units corresponding to the M ONUs that request the multicast program on demand.

6. The method according to claim 1, wherein the performing ONU overall rate limiting comprises:
performing, by using a method combining a priority queue and leaky bucket rate limiting or by using a leaky bucket rate limiting method, overall rate limiting on the ONUs that request the multicast program on demand.

7. An optical line terminal OLT, wherein the OLT comprises:
a memory storing a instructions; and
a processor, in communication with the memory, to execute the instructions to cause the OLT to:
receive a multicast program sent by a multicast program server;
make N+M copies of the multicast program;
send N copies of the multicast program to passive optical network PON ports that request the multicast program on demand;
send M copies of the multicast program to M ONU rate limiting units corresponding to M optical network units ONUs that request the multicast program on demand, wherein N and M are integers greater than or equal to 1;
send, using multiple PON ports, the multicast program to the optical network units ONUs that request the multicast program on demand; and
perform, by multiple rate limiting units, ONU overall rate limiting by using the multicast program, and after the rate limiting is completed, discard the multicast program.

8. The OLT according to claim 7, wherein the processor further executes the instructions to cause the OLT to create a first multicast forwarding entry and a second multicast forwarding entry, wherein the first multicast forwarding entry comprises a mapping relationship between the multicast program and the PON ports that request the multicast program on demand; and the second multicast forwarding entry comprises a mapping relationship among the multicast program, the passive optical network PON ports that request the multicast program on demand, and the ONUs that request the multicast program on demand.

9. The OLT according to claim 8, wherein the make N+M copies of the multicast program comprises:
querying the first multicast forwarding entry to acquire the quantity N of the PON ports that request the multicast program on demand;
querying the second multicast forwarding entry to acquire the quantity M of the ONUs that request the multicast program on demand; and
making N+M copies of the multicast program according to the quantity of the PON ports and the quantity of the ONUs.

10. The OLT according to claim 7, wherein the send N copies of the multicast program to passive optical network PON ports that request the multicast program on demand, and send M copies of the multicast program to M ONU rate limiting units corresponding to M optical network units ONUs that request the multicast program on demand comprises:
querying the first multicast forwarding entry to acquire the PON ports that request the multicast program on demand;
sending, according to the PON ports, the N copies of the multicast program to the N passive optical network PON ports that request the multicast program on demand;
querying the second multicast forwarding entry to acquire identifiers of the ONUs that request the multicast program on demand; and
sending, according to the identifiers of the ONUs, the M copies of the multicast program to the M ONU rate limiting units corresponding to the M ONUs that request the multicast program on demand.

11. The method according to claim 7, wherein the perform ONU overall rate limiting by using the multicast program received from the copying unit comprises:
performing, by the multicast program and by combining a priority queue and leaky bucket rate limiting or by leaky bucket rate limiting, overall rate limiting on the ONUs that request the multicast program on demand.

12. A passive optical network PON system, comprising an optical line terminal OLT, multiple optical network units ONUs or optical network terminals ONTs, and at least one optical distribution network ODN, wherein the OLT is separately connected to the multiple ONUs or ONTs by using the at least one ODN, and the OLT is configured to:
receive a multicast program sent by a multicast program server;
make N+M copies of the multicast program;
send N copies of the multicast program to N PON ports that request the multicast program on demand, so as to deliver the multicast program to ONUs that request the multicast program on demand by using the PON ports, wherein N is a quantity of PON ports connecting the ONUs that request the multicast program on demand to the OLT; and send M copies of the multicast program to M ONU rate limiting units corresponding to M ONUs that request the multicast program on demand, to perform ONU overall rate limiting, and after the ONU overall rate limiting is completed, discard the M copies of the multicast program, wherein N and M are integers greater than or equal to 1, and M is a quantity of the ONUs that request the multicast program on demand.

13. The PON system according to claim 12, wherein the OLT is configured to:

create a first multicast forwarding entry, wherein the first multicast forwarding entry comprises a mapping relationship between the multicast program and the PON ports that request the multicast program on demand; and create a second multicast forwarding entry, wherein the second multicast forwarding entry comprises a mapping relationship among the multicast program, the PON ports that request the multicast program on demand, and the ONUs that request the multicast program on demand.

14. The PON system according to claim 13, wherein the OLT is configured to:

query the first multicast forwarding entry to acquire the quantity N of the PON ports that request the multicast program on demand;

query the second multicast forwarding entry to acquire the quantity M of the ONUs that request the multicast program on demand; and make N+M copies of the multicast program according to the quantity of the PON ports and the quantity of the ONUs.

15. The PON system according to claim 13, wherein the OLT is configured to:

query the first multicast forwarding entry to acquire the PON ports that request the multicast program on demand; and send, according to the PON ports, the N copies of the multicast program to the N passive optical network PON ports that request the multicast program on demand.

16. The PON system according to claim 12, wherein the OLT is configured to:

perform, by using a method combining a priority queue and leaky bucket rate limiting or by using a leaky bucket rate limiting method, overall rate limiting on the ONUs that request the multicast program on demand.

* * * * *